(12) United States Patent
Gardner et al.

(10) Patent No.: US 9,159,016 B2
(45) Date of Patent: Oct. 13, 2015

(54) SYSTEM AND METHOD FOR PROVIDING TANGIBLE MEDIUM WITH ELECTROMAGNETIC SECURITY MARKER

(71) Applicant: LaserLock Technologies Inc., Washington, DC (US)

(72) Inventors: Norman A. Gardner, Bala Cynwyd, PA (US); Neil Alpert, Washington, DC (US); Peter Kuzma, Philadelphia, PA (US)

(73) Assignee: LaserLock Technologies Inc., Bala Cynwyd, PA (US)

( * ) Notice: Subject to any disclaimer, the term of this patent is extended or adjusted under 35 U.S.C. 154(b) by 0 days.

(21) Appl. No.: 14/212,757

(22) Filed: Mar. 14, 2014

(65) Prior Publication Data

US 2014/0263658 A1   Sep. 18, 2014

Related U.S. Application Data

(60) Provisional application No. 61/784,413, filed on Mar. 14, 2013.

(51) Int. Cl.
*G06K 19/02*   (2006.01)
*G06K 19/077*   (2006.01)

(52) U.S. Cl.
CPC .... *G06K 19/07749* (2013.01); *G06K 19/07798* (2013.01)

(58) Field of Classification Search
CPC ................ B42D 15/10; G06K 19/077; G06K 19/07749; G07F 7/1008; G06Q 20/341; G06Q 30/02

USPC .......................... 235/488, 492, 487, 380, 375
See application file for complete search history.

(56) References Cited

U.S. PATENT DOCUMENTS

| | | | |
|---|---|---|---|
| 3,989,775 A | 11/1976 | Jack et al. | |
| 4,582,294 A | 4/1986 | Fargo | |
| 5,702,511 A | 12/1997 | de Saint-Romain et al. | |
| 5,851,279 A | 12/1998 | Bäbler | |
| 6,313,754 B1 | 11/2001 | Shimomura et al. | |
| 6,483,576 B1 | 11/2002 | Gardner | |
| 6,672,718 B1 | 1/2004 | Stovold | |
| 6,768,555 B2 | 7/2004 | Chen et al. | |
| 6,813,011 B2 | 11/2004 | Gardner et al. | |
| 6,851,617 B2 | 2/2005 | Saint et al. | |
| 6,861,012 B2 | 3/2005 | Gardner et al. | |
| 7,095,324 B2 | 8/2006 | Conwell et al. | |
| 7,417,550 B2 | 8/2008 | Brown et al. | |
| 7,661,600 B2 * | 2/2010 | Theodossiou et al. | ........ 235/492 |
| 7,687,271 B2 | 3/2010 | Gelbart | |
| 7,701,408 B2 | 4/2010 | Bombay et al. | |
| 7,939,239 B2 | 5/2011 | Gardner et al. | |

(Continued)

OTHER PUBLICATIONS

Gardner et al., U.S. Office Action mailed Dec. 18, 2014, directed to U.S. Appl. No. 14/184,195; 12 pages.

(Continued)

*Primary Examiner* — Karl D Frech
(74) *Attorney, Agent, or Firm* — Morrison & Foerster LLP

(57) ABSTRACT

Mediums that include features that work together to create a medium that can be tracked, identified and authenticated efficiently and accurately. In addition, these features may be concealed to prevent or hinder potential copiers from copying or passing off a copy as an original. Further, these features may allow organizations to determine the origin of a copy.

20 Claims, 3 Drawing Sheets

(56) References Cited

U.S. PATENT DOCUMENTS

| | | | |
|---|---|---|---|
| 8,164,771 | B2 | 4/2012 | Hikichi et al. |
| 8,282,011 | B1 | 10/2012 | Skoine et al. |
| 8,551,683 | B2 | 10/2013 | Gardner et al. |
| 2002/0041372 | A1 | 4/2002 | Gardner et al. |
| 2002/0146146 | A1 | 10/2002 | Miolla et al. |
| 2003/0173406 | A1 | 9/2003 | Bi et al. |
| 2004/0238623 | A1 | 12/2004 | Asp |
| 2005/0122593 | A1 | 6/2005 | Johnson |
| 2005/0161512 | A1* | 7/2005 | Jones et al. ............... 235/487 |
| 2005/0236481 | A1 | 10/2005 | Gascoyne et al. |
| 2005/0239207 | A1 | 10/2005 | Gelbart |
| 2007/0069895 | A1 | 3/2007 | Koh |
| 2007/0247317 | A1 | 10/2007 | Farrell |
| 2008/0116276 | A1 | 5/2008 | Lo |
| 2008/0149820 | A1 | 6/2008 | Jordan et al. |
| 2011/0180607 | A1* | 7/2011 | Kennedy ................ 235/488 |
| 2012/0138857 | A1 | 6/2012 | Olm et al. |
| 2012/0200389 | A1 | 8/2012 | Solomon |
| 2012/0211564 | A1 | 8/2012 | Callegari et al. |
| 2012/0251715 | A1 | 10/2012 | Dalal et al. |
| 2014/0016325 | A1 | 1/2014 | Gardner et al. |
| 2014/0233842 | A1 | 8/2014 | Gardner et al. |
| 2014/0270334 | A1 | 9/2014 | Alpert et al. |

OTHER PUBLICATIONS

Gardner et al., U.S. Office Action mailed May 21, 2010, directed to U.S. Appl. No. 10/596,028; 6 pages.

Gardner et al., U.S. Office Action mailed Jan. 21, 2011, directed to U.S. Appl. No. 10/596,028; 8 pages.

Gardner et al., U.S. Office Action mailed Jan. 16, 2013, directed to U.S. Appl. No. 13/099,498; 6 pages.

International Search Report and Written Opinion mailed Aug. 9, 2005, directed to International Application No. PCT/US05/04579; 5 pages.

Communication pursuant to Article 94(3) EPC dated Mar. 22, 2013, directed to EP Application No. 05 713 481.9-1562; 5 pages.

Gardner et al., U.S. Office Action mailed Nov. 21, 2013, directed to U.S. Appl. No. 14/028,131; 10 pages.

Gardner et al., U.S. Office Action mailed Apr. 29, 2014, directed to U.S. Appl. No. 14/028,131; 10 pages.

Gardner et al., U.S. Appl. No. 61/766,372, filed Feb. 19, 2013; 18 pages.

International Search Report and Written Opinion mailed Jun. 11, 2014, directed to International Application No. PCT/US2014/017196; 9 pages.

International Search Report and Written Opinion mailed Aug. 7, 2014, directed to International Application No. PCT/US14/29425; 12 pages.

International Search Report and Written Opinion mailed Aug. 4, 2014, directed to International Application No. PCT/US2014/23757; 9 pages.

Japanese Industrial Standards Committee, Divisional Council on Basic Items. (Mar. 1, 1990). "Classification of Fluorescent Lamps by Chromaticity and Colour Rendering Property," *Japanese Industrial Standard* (JIS) Z 9112—1990: 1-7.

Kamiya S. (1999). "Phosphors for lamps" Chapter 5—Section Two in *Phosphor Handbook*. Phosphor Research Society, CRC Press, pp. 367-373.

AlpVision. (2012). "Cryptograph Digital Security Solution," retrieved on May 27, 2014. Retrieved from <http://www.alpvision.com/cryptoglyph-covert-marking.html>, 3 pages.

* cited by examiner

SYSTEM AND METHOD FOR PROVIDING TANGIBLE MEDIUM WITH ELECTROMAGNETIC SECURITY MARKER

CROSS-REFERENCE TO RELATED APPLICATIONS

This application claims the benefit of U.S. Provisional Application Ser. No. 61/784,413, filed Mar. 14, 2013, the entire contents of which are incorporated herein.

FIELD OF THE INVENTION

The present invention is directed to a system and method for the protection of data and other information that is affixed in a tangible medium. More specifically, the present invention relates to a secure medium that includes features that allow the medium to be tracked, identified and authenticated.

BACKGROUND OF THE INVENTION

The protection and tracking of a tangible medium containing data, such as a confidential paper, has recently become both more important and less successful. This is because a tangible medium, such as papers, is typically very easy to hide and remove from otherwise secure facilities. Further, the copying of a tangible medium has become easier with the advent of more sophisticated copying devices. When copies have been made, it is often difficult to determine what is an original and what is a copy. Further, it is often difficult to determine where the copy originated.

SUMMARY OF THE INVENTION

The described mediums include features that work together to create a medium that can be tracked, identified and authenticated efficiently and accurately. In addition, these features may be concealed to prevent or hinder potential copiers from copying or passing off a copy as an original. Further, these features may allow organizations to determine the origin of a copy.

An embodiment of a secure medium may include a detectable element laminated between layers of the medium, and printed authentication elements on a surface of the medium. The secure medium may be a sheet of paper.

The detectable element may, for example, be an Electro-Magnetic (EM) element or a radio-frequency identification (RFID) tag.

The location of the detectable medium may be disguised, for example, by using printed features on the medium. The printed authentication elements may be printed with an ink that changes its characteristics and appears as different colors in different types of light. The medium may further be scored to identify tampering.

Another embodiment of a secure medium may include a detectable element adhered to a medium, and printed authentication elements on a surface of the medium. The detectable element may be adhered to the medium such that removal of the detectable element will damage or destroy the medium. The detectable element may, for example, be an Electro-Magnetic (EM) element or a radio-frequency identification (RFID) tag. The secure medium may be a sheet of paper. The printed authentication elements may be printed with an ink that changes its characteristics and appears as different colors in different types of light. The medium may further be scored to identify tampering.

Another embodiment of a secure medium may include an intermediate member adhered to a medium, a detectable element incorporated in the intermediate member, and printed authentication elements on a surface of the medium. The detectable element may be embedded within the intermediate member. The detectable element may, for example, be an Electro-Magnetic (EM) element or a radio-frequency identification (RFID) tag. The intermediate member may be adhered to the medium such that removal of the intermediate member will damage or destroy the medium. The printed authentication elements may be printed with an ink that changes its characteristics and appears as different colors in different types of light. The medium may further be scored to identify tampering.

Additional advantages of this invention will become readily apparent to those skilled in the art from the following detailed description. As will be realized, this invention is capable of other and different embodiments, and its details are capable of modifications in various obvious respects, all without departing from this invention. Accordingly, the examples and description are to be regarded as illustrative in nature and not as restrictive.

DETAILED DESCRIPTION OF THE INVENTION

Figure 1:
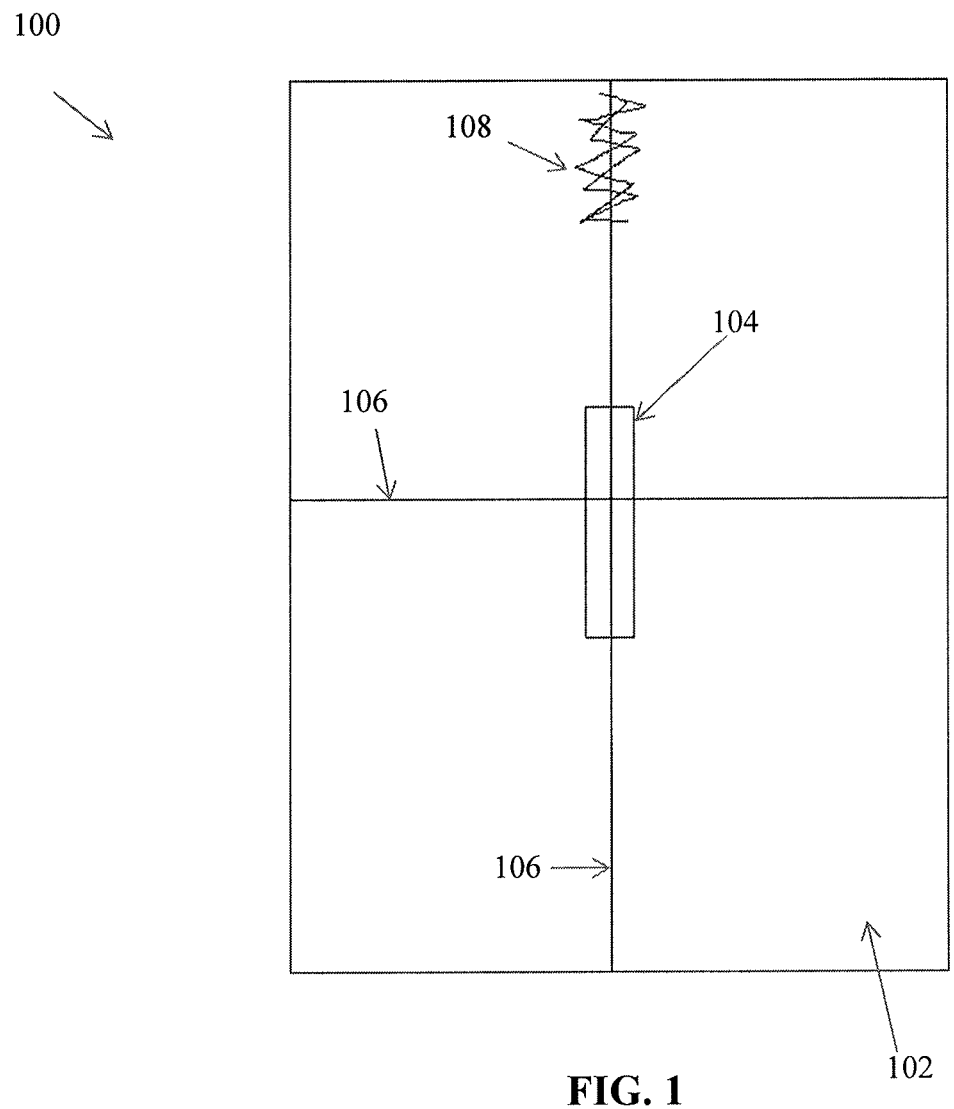
FIG. 1 is an illustration of a secure paper including a detectable element laminated within a sheet of paper.

It is to be understood that the figures and descriptions of embodiments of the present disclosure have been simplified to illustrate elements/steps relevant for a clear understanding of the present disclosure, while eliminating, for the purpose of clarity, other elements/steps found or used in typical presentations, productions, data delivery, computing systems, devices and processes. Those of ordinary skill in the art may recognize that other elements and/or steps are desirable and/or required in implementing embodiments of the present disclosure. However, because such elements and steps are well known in the art, and do not facilitate a better understanding of the present disclosure, a discussion of such elements/steps is not provided herein.

Embodiments of the present disclosure relate to a medium that can store information. A particular example of such a medium is paper. However, it is to be understood that the invention is not so limited, and other media could be used.

In some embodiments, the medium includes a detectable tracking element such as an Electro-Magnetic (EM) filament or other tracking device. This detectable element can be hidden in the medium by, for example, laminating it between layers of the medium. For example, an EM filament may be embedded between two paper layers to form a single piece of trackable paper. Removing the tracking device would then require damaging or destroying the medium. In some embodiments the tracking device is adhered to the medium, for example using an adhesive label or tape. Preferably, the tracking device is adhered to the medium in such a way that removal of the tracking device results in extensive damage or destruction of the medium.

In some embodiments, the location of the trackable element within the medium is disguised. This can be done in a variety of manners. For example, lines or other printable features can be printed on the paper at locations that correspond to the location of the tracking element and locations that do not correspond to the location of the trackable element. These printable features can disguise the actual location of the trackable element. In some embodiments, additional elements may be laminated or otherwise added to the medium to disguise the location of the actual trackable medium. For example, in addition to laminating an EM filament in the paper, additional non-EM filaments that have the same or similar visual characteristics as the EM filament may also be laminated in the paper. By disguising the location of the trackable element, the trackable element cannot be removed simply by damaging/cutting the medium just at the location of trackable element.

In addition to the trackable element, in some embodiments the medium also includes authentication elements or features that can be used to authenticate the originality of the medium. By way of non-limiting example, the medium may include features or elements printed with ink that appears as different colors in different types of light. U.S. patent application Ser. No. 13/099,498, incorporated by reference herein in it's entirely, describes a pigment that may appear as a first color in one type of white light and as a distinct second color in another type of white light. Based on the layouts of the ink, different patterns of color may emerge that provide various types of information relating to content and/or nature of the media. In addition, U.S. Provisional Application Ser. No. 61/766,372, incorporated by reference herein in it's entirely, describes a characteristic verification system that includes security marks, devices, systems and methods that may be used to authenticate a material good such a paper or other medium.

In some embodiments, the medium may also include printed indicia that prevents copying or indicates that a copy is a copy and not an original. This indicia can be printed so that it is visually recognizable only on copies of the original.

Referring now to FIG. 1, an embodiment 100 is shown. The embodiment 100 includes a media 102 and a detectable element 104. Detectable element 104 may be attached to, printed on, embedded within, or otherwise incorporated in the media 102. Lines 106 can be lines or other printable features printed on media 102 to disguise the location of detectable element 104.

The nature of the attachment may be particular to the type of detectable element 104. The location, shape and size of detectable element 104 as shown in FIG. 1 is exemplary only.

Figure 2:
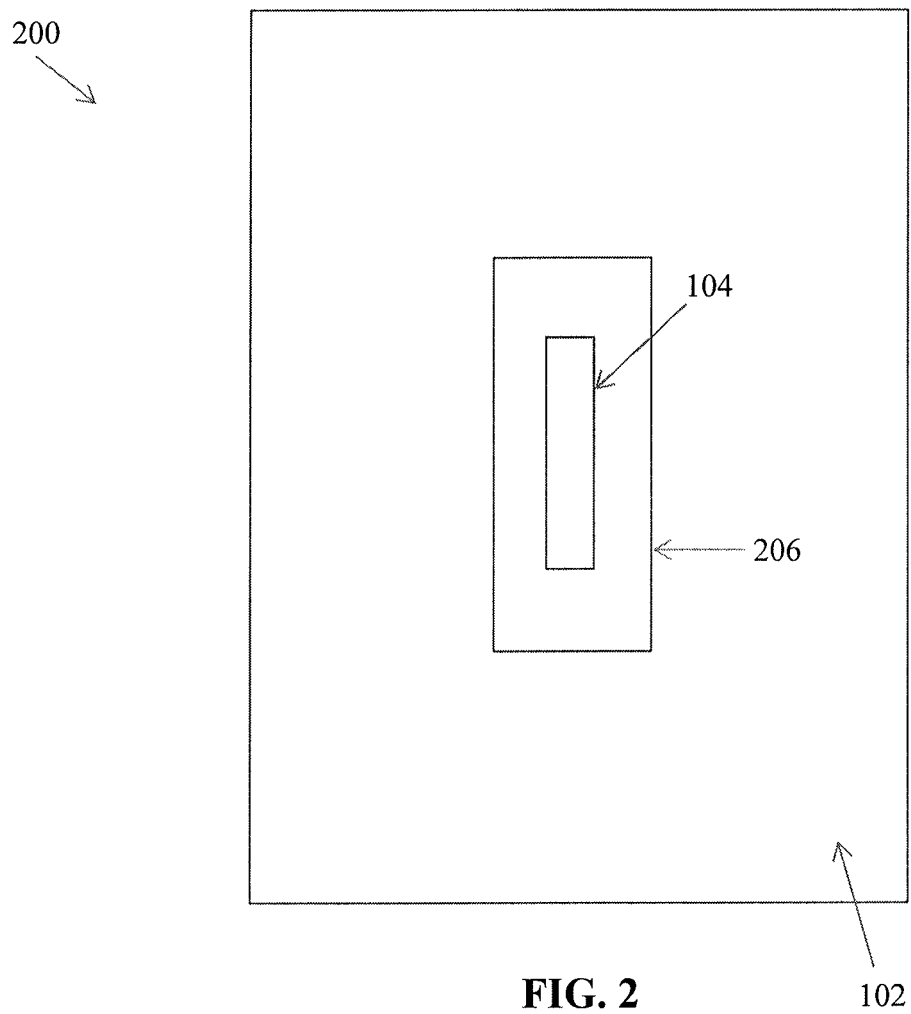
FIG. 2 is an illustration of a secure paper including a detectable element adhered to a label that is affixed to a sheet of paper.

Referring now to FIG. 2, another embodiment 200 is shown. The embodiment 200 includes a media 102 and a detectable element 104 as in FIG. 1, but the detectable element 104 is applied to media 102 by an intermediate member 206, such as an adhesive label. Detectable element 104 may be attached to, printed on, embedded within, or otherwise incorporated in the intermediate member 206. The nature of the attachment may be particular to the type of detectable element 104. The location, shape and size of detectable element 104 and intermediate member 206 as shown in FIG. 2 is exemplary only.

Detectable element 104 may also be used as part of a laminated system such as being incorporated between media that are laminated together. This can, for example, secure and/or insulate detectable element 104 from exterior conditions such as if the media is accidentally exposed to water or other exterior conditions.

Figure 3:
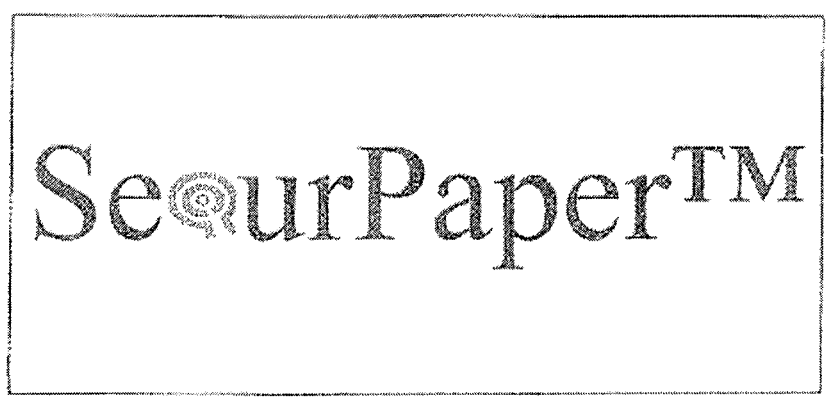
FIG. 3 is an illustration of an embodiment of a secure paper with security indicia.

Detectable element 104 may be used as part of a system wherein blank media 102 is supplied to copiers, facsimile machines and the like to enable copies or facsimile transmissions to store information in a protected format as contemplated by the present invention. Blank media may also contain other security indicia as shown in FIG. 3 or markings contemplated herein this disclosure as well as wherein such indicia or markings and combinations further provide authentication features and protections.

Below follows several non-limiting examples of detectable element 104.

Detectable element 104 may include ink having certain physical properties that varies relative to its environment.

Another type of ink would include some type of particle(s) suspended therein that react to particular environment conditions. Ink with magnetic particles or dipole based materials may exhibit certain physical characteristics that can be detected at range.

Detectable element 104 may be one or more threads having properties similar to the inks noted above. These threads could be woven into the media 102 or the intervening member 206, and be similarly detectable. Multiple threads having different characteristics and/or orientations could be used to create distinct patterns.

Detectable element 104 may be an electromagnetic element or component that may be passive and/or active and may function to identify the document, track and trace the location of the document and trigger, for example, a detection system should the article be transported from a secure location.

By way of non-limiting example, the detectable element 104 may be a location related device, such as a GPS device. The device would preferably include a GPS receiver, memory, a wireless modem, and/or power source. The GPS receiver would determine its position, either periodically or on demand, to determine its location, and could transmit that information. The GPS device could also have some type of identifier and/or other information about the media 102 that it would also transmit, either separately or collectively, with position data. Power could be supplied by a small local power source, such as a battery or an inductor responsive to external stimulation by an appropriate radio signal.

In another example, the detectable element may be a RFID tag, which includes an antenna and a media that stores an identifier and/or other information about the tag or the media 102. When in the presence of a tuned external radio signal, the tag will transmit its identifier and/or other information.

There are many types of information that the detectable element 104 may provide. For example, the information may identify the content or type of content of media 102. In another example, the information may identify a classification of the document, such as public, secret or top secret. In this manner the information may be unique to each detectable element 104, or specific to a group of detectable elements 104. For example, unique information may be a unique code within that tracking system so that the detectable identifier is not confused with any other. A classification type of information may be the same for multiple detectable identifiers 104.

Detectable element 104 may function to identify the media 102 in which it is incorporated, including, for example, portions of the medium such as each page of a document. Detectable element 104 may further provide a signal that may be detected by a reader, receiver or the like, thereby identifying the media 102, content in media 102 and/or the location of media 102.

Detectable element 104 may be capable of being detected among a group of media 102 which media may or may not include other detectable elements. Preferably, each detectable element 104 has a unique signature or identifying code, although as noted above this need not be the case. While the detectable element 104 element may be active, passive or a combination of these features, preferably it is a passive element that responds to energy being delivered by a detector or system of detectors as is more fully disclosed herein.

Detectable element 104 may be used in combination with features of the medium to impart further security features. The type of security may be partially dependent upon the type of detectable element. For example, tampering with the inks, threads and/or patterns of the inks/threads may change the way those inks respond and/or appear; such tampering may comprise scoring 108, as shown in FIG. 1, in a manner that upon tampering the medium tears, shreds or deforms in a manner that may be obvious to the naked eye or may be unobvious but otherwise detectable by some reader. For electronic based detail elements 104, tampering with the electronics may trigger an alarm, such as by interrupting a continuous circuit.

The detectable element 104 may become part of a system wherein detectors make it possible to locate the medium within a building or room therein as well as to track the movement of the media 102. For example, detectors could be placed at various stations in a multi-stage or step approval process and thus the timeliness and/or efficiency of the examination may be measured and/or delay in a given step be calculated and remedied. If a specific sequence of steps is contemplated and any one step is missed, the system would enable quality control to remove the particular item from a batch being processed for reprocessing/completion of the missing step or discarded if such missing step were cause for a defect.

The media 102 may be such that it could cause data, information and/or condition to be uploaded to the Internet from which other interested persons could track the particular medium, relevant conditions the medium was exposed, location, process etc.

The foregoing components may form part of an inventory control system, anti-counterfeiting system, track and trace system through a supply chain, as well as to monitor conditions to which the detectable element 104 was exposed; for example temperature, moisture, date stamping/aging sensors or mechanisms as a part of or in communication with the detectable element 104 to provide such information when detected by the detectors and/or data from the medium is uploaded or uplinked into the system.

It will be apparent to those skilled in the art that modifications and variations may be made in the systems and methods of the present disclosure without departing from the spirit or scope of the invention. It is intended that the present disclosure cover the modifications and variations of this invention provided they come within the scope of the appended claims and their equivalents.

What is claimed as new and desired to be protected by Letters Patent of the United States is:

1. A secure medium comprising:
a detectable element laminated between layers of a medium; and
printed authentication elements on a surface of the medium, wherein at least a part of the printed authentication elements is provided on top of the detectable element,
wherein the printed authentication elements are visible in a first color under a first lighting condition, and the printed authentication elements are visible in a second color under a second lighting condition.

2. The secure medium of claim 1, wherein the detectable element is an Electro-Magnetic (EM) element.

3. The secure medium of claim 1, wherein the detectable element is a radio-frequency identification (RFID) tag.

4. The secure medium of claim 1, wherein the secure medium is a sheet of paper.

5. The secure medium of claim 4, wherein the location of the detectable medium is disguised using the printed authentication elements on the surface of the medium.

6. The secure medium of claim 1, wherein the location of the detectable element is disguised.

7. The secure medium of claim 1, wherein the printed authentication elements are printed with an ink that appears as different colors when illuminated by different types of light.

8. The secure medium of claim 1, wherein the medium is scored to identify tampering.

9. A secure medium comprising:
a detectable element adhered to a medium; and
printed authentication elements on a surface of the medium, wherein at least a part of the printed authentication elements is provided on top of the detectable element,
wherein the printed authentication elements are visible in a first color under a first lighting condition, and the printed authentication elements are visible in a second color under a second lighting condition.

10. The secure medium of claim 9, wherein the detectable element is adhered to the medium such that removable of the detectable element will damage or destroy the medium.

11. The secure medium of claim 9, wherein the detectable element is an Electro-Magnetic (EM) element.

12. The secure medium of claim 9, wherein the detectable element is a radio-frequency identification (RFID) tag.

13. The secure medium of claim 9, wherein the secure medium is a sheet of paper.

14. The secure medium of claim 9, wherein the printed authentication elements are printed with an ink that appears as different colors when illuminated by different types of light.

15. The secure medium of claim 9, wherein the medium is scored to identify tampering.

16. A secure medium comprising:
an intermediate member adhered to a medium;
a detectable element incorporated in the intermediate member; and
printed authentication elements on a surface of the medium, wherein at least a part of the printed authentication elements is provided on top of the detectable element,
wherein the printed authentication elements are visible in a first color under a first lighting condition, and the printed authentication elements are visible in a second color under a second lighting condition.

17. The secure medium of claim 16, wherein the detectable element is embedded within the intermediate member.

18. The secure medium of claim 16, wherein the detectable element is an Electro-Magnetic (EM) element.

19. The secure medium of claim 16, wherein the detectable element is a radio-frequency identification (RFID) tag.

20. The secure medium of claim 16, wherein the printed authentication elements are printed with an ink that appears as different colors when illuminated by different types of light.

* * * * *